United States Patent Office 3,188,336
Patented June 8, 1965

3,188,336
TRIFLUOROMETHYL-HYDROCARBON
DICHLORO SILANES
Robert N. Haszeldine, Windyridge, Lynn Road,
Disley, Cheshire, England
No Drawing. Filed July 10, 1958, Ser. No. 747,802
Claims priority, application Great Britain, July 22, 1957,
23,209/57
1 Claim. (Cl. 260—448.2)

This invention relates to silicon polymers of improved stability, to the silane intermediates for the preparation of these polymers, and to methods for preparing such silane intermediates.

Polymeric organosilicon compounds are well known and fall into two categories, viz. (a) silicones of the general formula $[R_2SiO]_n$, for example, the methyl silicones $[(CH_3)_2SiO]_n$, which are liquids, oils or greases and, when cross-linked, are of a rubbery nature and (b) three dimensional polysiloxanes of the general formula $[RSiO_{1.5}]_n$ which are resins.

Known polymers of this type exhibit a high degree of thermal stability and also a useful degree of resistance to attack by chemicals. They are, however, susceptible to attack by, for example, (a) hydrocarbons, particularly aromatic hydrocarbons and carbon tetrachloride which dissolve them or cause swelling; (b) concentrated sulfuric acid which hydrolyzes them; (c) concentrated nitric acid and hydrogen peroxide and air at high temperature, all of which oxidize them; (d) chlorine which attacks the C—H bonds to give unstable products and (e) $UF_6$ which also attacks the C—H bonds.

The weak point in the silicon polymers is the silicon-attached alkyl group since this group is sensitive to attack by chemicals which are reactive toward hydrocarbons. Also the good solubility of the polymers in hydrocarbons such as petroleum fuels and hydraulic fluids is a particular disadvantage in certain applications such as lubrication, gasketing or surface coating.

As is well known, the introduction of fluorine into an organic compound usually has a marked effect in stabilizing the compound against chemical attack. Thus for example, polymers and telomers prepared from fluorinated olefins such as $CF_2=CF_2$ and $CF_2=CFCl$ are noted for their chemical stability and find numerous commercial applications by reason of this property. It was therefore to be expected that the replacement of silicon attached alkyl groups in organosilicon polymers by perfluoroalkyl groups would result in improvement in chemical stability. It has been found surprisingly, however, that often the replacement of hydrogen by fluorine in such polymers may have no beneficial effect. For example, the replacement of the methyl groups present in the usual commercial silicon oils not only results in no improvement in thermal and chemical stability, but actually impairs the stability of the polymer. Furthermore, if fluorine is introduced on carbon atoms beta to the silicon, it is found that the thermal and chemical stability of the polymer is in no way improved.

In accordance with the present invention, a class of fluorine-containing organosilicon polymers have been found which surprisingly have markedly enhanced stability against chemical attack. These polymers, as distinguished from those mentioned above, contain no fluorine on the carbon atoms which are alpha or beta to the silicon atom. Specifically, the polymers of the invention of improved chemical stability are those derived from silanes of the general formula $(R^1CF_2CHR^2CH_2)_2SiCl_2$ where $R^1$ is fluorine, hydrogen or a perfluoroalkyl radical preferably having from one to four carbon atoms and where $R^2$ is hydrogen or a $CH_3$, $CF_3$, $C_2F_5$, or a $C_3F_7$ radical. The linear polymers that may be derived from these silanes by hydrolysis have the general formula $[(R^1CF_2CHR^2CH_2)_2SiO]_n$ where $R^1$ and $R^2$ are as defined above and where $n$ is an integer of a series 1, 2, 3, 4, etc., having a value in the range of from 10 to 100,000 and preferably from 50 to 1,000. These linear polymers may be converted to cross-linked polymers, particularly those of a rubbery nature, by well known methods. As is demonstrated by the description which follows, these polymers, both those of linear and cross-linked nature, have markedly improved resistance to deterioration by chemical agents.

The silanes which serve as intermediates for the preparation of these organosilicon polymers are prepared, in accordance with the invention, by reacting dichlorosilane $SiH_2Cl_2$, under conditions favoring the formation of free radicals, with an olefin of the general formula $$R^1CF_2CR^2=CH_2$$

The intermediate silane $(R^1CF_2CHR^2CH_2)_2SiCl_2$ thus produced is then converted to polymers by direct or indirect aqueous hydrolysis. The reactions involved may be represented as follows:

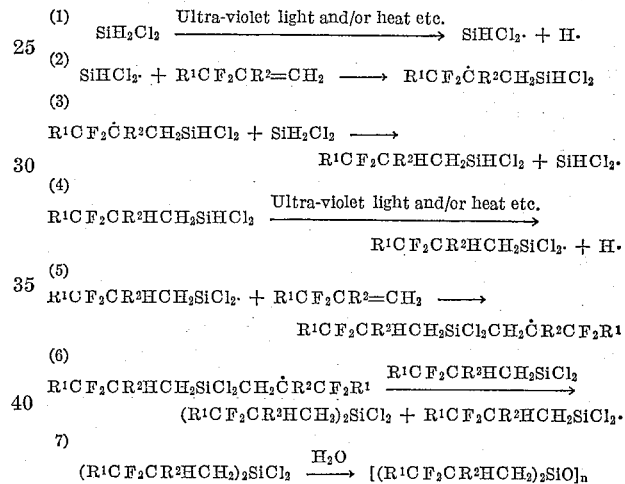

In the reaction of dichlorosilane with the olefin to prepare the silane intermediate, a variety of procedures may be employed to cause free radical formation. These include the use of ultraviolet light, a combination of heat and ultraviolet light, an initiator compound with or without heat, a radioactive initiator, or heat alone.

When ultraviolet light is used, the temperature is not critical and the reaction may be conducted at room temperature or above, e.g., a temperature up to 200° C.

When using an initiator, the particular compound chosen should be one which will form free radicals under the conditions of the reaction and which is compatible with the reactants and the products of the reaction. Examples of suitable initiators are organic peroxide compounds such as, e.g., benzoyl peroxide, acetyl peroxide, hexachloroacetyl peroxide, hexafluoroacetyl peroxide, and di-tertiarybutyl peroxide. Azo initiators such as azo-isobutyronitrile, are also suitable. When an initiator is employed, the reaction should be conducted at a temperature such that the initiator will form free radicals. This may be room temperature or even lower, but the temperature is usually between 50° C. and 150° C.

When heat alone is used, the temperature must be sufficient to cause the reactants themselves to form free radicals. In general, temperatures in the range of from 50° C. to 400° C. are suitable. The use of heat alone is commercially attractive in that it lends itself to a continuous operation in which the reactants are caused to flow through a heated tube.

In general, the pressure is not critical and may range, e.g., from 0.1 to 50 atmospheres, or higher.

In order to secure optimum yields of the desired disubstituted dichlorosilane $(R^1CF_2CHR^2CH_2)_2SiCl_2$ a molar excess of the starting olefin should be employed. Preferably the molar ratio of olefin to dichlorosilane is in the range of from 2:1 to 4:1. The use of excess olefin is feasible in the process of the invention since the starting olefins are of such a nature that they do not undergo homopolymerization to any substantial extent under the conditions of the addition reaction. In this respect, the behavior of the starting olefins used in the present invention is to be contrasted with that of a fluoroolefin such as tetrafluoroethylene $CF_2=CF_2$ which readily homopolymerizes, and under the conditions of the reaction would form undesirable polymeric side products.

The method of the invention for obtaining the desired disubstituted dichlorosilane intermediate for the production of improved silicon polymers has considerable advantages. The reaction is carried out in one step to produce high yields and the position of the fluorine substituents in the silane is readily achieved by employing the proper fluorine-substituted starting olefin.

Other methods for the preparation of organosilanes commonly used have disadvantages to which the method of the invention is not subject. One conventional method, e.g., employs the Grignard reagent, e.g., $CH_3MgCl$ reacted with $SiCl_4$. This method suffers from the disadvantage of the expense of the Grignard reagent and the ether normally used as solvent. Furthermore, in addition to the desired di-substituted dichlorosilane, mono, tri, and tetra substituted by-products are also formed in significant amounts.

A second method commonly used for the preparation of organosilanes involves the reaction of SiCu with an alkyl chloride, e.g., the reaction of SiCu with $CH_3Cl$. This second method is very useful for the preparation of methyl silicon compounds, but gives only very low yields with fluorine containing alkyl halides, since $SiF_4$ formation predominates. Precise and tedious fractional distillation is necessary to separate $CH_3SiCl_3$ and $(CH_3)_2SiCl_2$ from the many by-products.

The final hydrolysis step in which the di-substituted dichlorosilane is hydrolyzed to produce the organosilicon polymer can be carried out by the usual techniques, either by direct hydrolysis of silane or indirectly, e.g., by hydrolysis of an alkoxy derivative of the intermediate as will be illustrated in the examples which follow.

The linear silicones $[(R^1CF_2CHR^2CH_2)_2SiO]_n$ provided by the invention are readily convertible into new rubbery products by cross-linking. The cross-linking may be achieved in any of the various ways known to be suitable for the conventional dimethyl silicon polymer, but the preferred method involves treating the linear polymer with benzoyl peroxide while heating.

As mentioned above, the olefins that may be reacted with dichlorosilane to produce the intermediate di-substituted dichlorosilanes of the invention are those of the general formula $R^1CF_2CR^2=CH_2$ where $R^1$ and $R^2$ as defined above. The olefin $CF_3CH_2=CH_2$ is preferred in the practice of the invention because of its relative cheapness and availability and because of the excellence of the organosilicon polymers that may be prepared therefrom. Other specific olefins that may be employed include, for example, $CF_3CF_2CH=CH_2$, $C_2F_5CF_2CH=CH_2$, $C_4F_9CF_2CH=CH_2$, $(CF_3)(CH_3)C=CH_2$ $(C_2F_5CF_2)(CH_3)C=CH_2$, $(CF_3)_2C=CH_2$ $(CF_3)(C_4F_9)C=CH_2$, $(C_2F_5)(C_3F_7)C=CH_2$ These olefins, by reaction with dichlorosilane, produce respectively the following di-substituted dichlorosilanes:

$(CF_3CF_2CH_2CH_2)_2SiCl_2$, $(C_2F_5CF_2CH_2CH_2)_2SiCl_2$ $(C_4F_9CF_2CH_2CH_2)_2SiCl_2$, $[(CF_3)(CH_3)CHCH_2]_2SiCl_2$

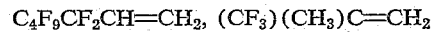

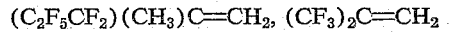

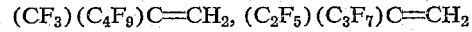

These dichlorosilanes may be hydrolyzed in the usual manner to produce fluorine-containing organosilicon polymers of markedly enhanced chemical stability.

The invention is illustrated by the following examples in which the reactions described are carried out in tubes sealed in vacuo and from which air and moisture has been excluded.

EXAMPLE I 35 millimoles of dichlorosilane and 102 millimoles of 3,3,3-trifluoropropene (molar ratio of olefin to dichlorosilane equals 3:1) were placed in an evacuated silica tube which is sealed and then irradiated with ultraviolet light for 107 hours at room temperature. The products were distilled in vacuo giving unchanged olefin, and yields (based on dichlorosilane) of 77% of bis(3,3,3-trifluoropropyl)-dichlorosilane $(CF_3CH_2CH_2)_2SiCl_2$, having a boiling point of 162 to 163° C., and 9% of 3,3,3-trifluoropropyl dichlorosilane $CF_3CH_2CH_2SiHCl_2$.

EXAMPLE II

This example illustrates the importance of the use of a molar excess of the olefin in order to obtain the desired di-substituted dichlorosilane. 40 millimoles of 3,3,3-trifluoropropene and 100 millimoles of dichlorosilane (molar ratio of olefin to dichlorosilane equals 2:5) are sealed in a 200 ml. silica tube and exposed to ultraviolet light for 64 hours. Distillation in vacuo gave unchanged dichlorosilane (51%), unchanged olefin (3%), trichlorosilane (2%) and 3,3,3 - trifluoropropyl-dichlorosilane $CF_3CH_2CH_2SiHCl_2$ (83%). This latter compound has a boiling point of 90 to 91° C. and was analyzed as follows:

Calculated for $C_3H_5Cl_2F_3Si$: C, 18.3; H, 2.5. Found: C, 18.2; H, 2.4.

A small amount of liquid product of higher boiling point probably the di-substituted dichlorosilane was also obtained $(CF_3CH_2CH_2)_2SiCl_2$.

EXAMPLE III 70 millimoles of the mono-substituted dichlorosilane $CF_3CH_2CH_2SiHCl_2$ prepared as in Example II and 65 millimoles of 3,3,3-trifluoropropene were sealed in an evacuated silica tube and irradiated for 80 hours with ultraviolet light. Distillation in vacuo gave unchanged reactant (8%) and the di-substituted dichlorosilane $(CF_3CH_2CH_2)_2SiCl_2$ (85%) having a boiling point of 162 to 163° C. This latter compound is analyzed as follows:

Calculated for $C_6H_8Cl_2F_3Si$: C, 24.6; H, 2.7. Found: C, 24.4; H, 2.5.

EXAMPLE IV 20 ml. of a saturated solution of water in diethyl ether is slowly added to a mixture of 2.7 g. of $(CF_3CH_2CH_2)_2SiCl_2$ and 5 ml. of diethyl ether. This solution is then poured with stirring into an excess of water (10 ml.). This reaction mixture is then extracted with ether, and the ethereal extract is then dried. After removal of the ether the silicone $[(CF_3CH_2CH_2)_2SiO]_n$ a linear polymer is obtained in a 91% yield. This is a colorless, very viscous oil having a negligible viscosity at 200° C. The silicone is analyzed as follows:

Calculated for $C_6H_8OF_6Si$: C, 30.3; H, 3.4. Found: C, 30.1; H, 3.5.

EXAMPLE V

This example illustrates an alternative method for obtaining the silicone polymer from the di-substituted dichlorosilane involving the preparation of a methoxy derivative of the silane followed by hydrolysis of the methoxy derivative. 2.9 grams of $(CF_3CH_2CH_2)_2SiCl_2$ was stirred with a 10% excess of anhydrous methanol at room temperature to give bis(3,3,3-trifluoropropyl)-dimethoxysilane $(CF_3CH_2CH_2)_2Si(OCH_3)_2$ (88% yield). This com-

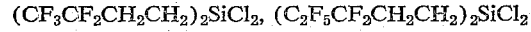

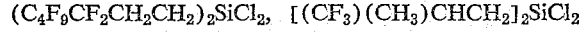

pound has a boiling point of 175° to 176° C. at atmospheric pressure and a boiling point of 96° C. at 60 mm. Hg. It was analyzed as follows:

Calculated for $C_6H_{14}O_2F_6Si$: C, 33.8; H, 4.9. Found: C, 33.5; H, 4.9.

This compound was hydrolyzed following the general procedures of Example IV to produce a silicone oil similar to that obtained in Example IV.

EXAMPLE VI

The viscous silicone oil obtained in Example IV is converted to a rubbery cross-linked polymer by the following procedure. 3.5 g. of the silicon oil of Example IV is thoroughly admixed with 5% by weight of benzoyl peroxide and the mixture heated at 150 to 180° C. for 4 hours. The product obtained is a faintly opaque white gum rubber.

The surprising superiority of the fluorine containing organosilicon polymers of the invention over conventional hydrocarbon silicon polymers and other types of fluorine containing organosilicon polymers is evident from the following data:

*Properties of dimethyl silicone $[(CH_3)_2SiO]_n$*

(1) *Thermal stability.*—Stable at 200° C. only when protected from the atmosphere.

(2) *Chemical stability.*—Undergoes degradation with concentrated sulfuric and nitric acid and concentrated $H_2O_2$; chlorine, and $UF_6$ and air at high temperatures. For example, dimethylsilicone shows an increase in viscosity within 12 hours and gives a rubbery gel at 250° C. in contact with air.

(3) *Solubility.*—Dissolved or swollen by carbon tetrachloride and hydrocarbons, such as petroleum hydrocarbons and aromatic hydrocarbons, e.g. toluene.

*Properties of various prior art fluorine containing organosilicon polymers*

(1) *Thermal stability.*—Many prior art fluorine containing organosilicon polymers have reduced thermal stability as compared with non-fluorinated silicones and polysiloxanes. For example, the fluorinated polysiloxane $(CF_2ClCF_2SiO_{1.5})_n$ when heated at 250° C. for 10 hours in the absence of air gave more than a 70% yield of $CF_2=CFCl$ and $SiF_4$ by C—Si cleavage. The polysiloxane $(CHF_2CH_2SiO_{1.5})_n$ when heated at 250° C. for 10 hours in the absence of air, gave more than a 60% yield of $CH_2=CHF$ and $SiF_4$.

(2) *Chemical stability.*—Many of these fluorine containing organosilicon polymers are less stable toward aqueous bases than non-fluorinated silicones. For example each of the fluorinated silicones $[(CF_3)_2SiO]_n$ and $[(CHF_2CF_2)_2SiO]_n$ when treated with an excess of 5% aqueous NaOH at 20° C. for 3 hours gave a 100% yield of the hydrolysis products $CHF_3$ and $CHF_2CHF_2$ respectively. The polysiloxanes $[CHF_2CH_2SiO_{1.5}]_n$ and

$[CF_2ClCF_2SiO_{1.5}]_n$ similarly yielded $CHF_2CHF_2$ and $CF_2ClCHF_2$ respectively. Likewise when the polysiloxane $[CHF_2CH_2SiO_{1.5}]_n$ is treated with an excess of 5% NaOH at 20° C. for 3 hours an almost quantitative yield of $CH_2=CHF$ was obtained.

*Properties of organosilicon polymers prepared in accordance with the invention*

(1) *Thermal stability.*—Improved both over non-fluorinated organosilicon polymers and the fluorine containing organosilicon polymer discussed above. For example, the silicone $[(CF_3CH_2CH_2)_2SiO]_n$ prepared in accordance with Example IV is unaffected after being kept at 250° C. for several hours. Only a small amount (10 to 15%) of volatile products are obtained after holding this silicone at 6 hours at 300° C.; distillation of the lower boiling silicone fractions occurred to a small extent at this temperature. The silicone rubber of Example VI is similarly unaffected when held at 250° C. for 5 hours; and significant decomposition set in only at 300° C.

(2) *Chemical stability.*—A. Concentrated $HNO_3$. No attack at 100° C. on the silicone of Example IV in contrast to the dimethyl silicones and prior fluorinated silicones discussed above which are degraded under these conditions.

B. Aqueous base. Markedly better resistance in contrast to the prior fluorinated silicon polymers discussed above. For example, no reaction is detected when the silicone $[(CF_3CH_2CH_2)_2SiO]_n$ of Example IV is treated with an excess of 5% NaOH at 20° C. for 3 hours; similarly no attack is detected when this experiment is repeated with 10% NaOH at 100° C.

C. Chlorine. Markedly improved resistance to chlorine in contrast to dimethyl silicone polymers. When under vigorous conditions, chlorine attack on the silicone of Example IV does occur, the resulting chlorinated polyfluoroalkyl groups in the polymer are still stable. By contrast, the attack of chlorine at a much lower temperature on dimethyl silicone leads to an unstable product.

D. Air. The silicone of Example IV when heated for several hours at 200° C. in air shows no change, in contrast to dimethyl silicone which undergoes substantial degradation under these conditions.

E. Hydrogen peroxide. No signs of attack on the silicone of Example IV under conditions at which dimethyl silicone is attacked.

F. Uranium hexafluoride. The silicone of Example IV shows higher stability in the presence of this reagent than dimethyl silicone the terminal $CF_3$ group apparently affording protection against fluorination.

*Solubility*

In contrast to dimethyl silicone the silicone oil of Example IV and the silicone rubber of Example VI are scarcely soluble or swollen by carbon tetrachloride and hydrocarbons such as aromatic hydrocarbons, e.g., toluene and gasoline.

In addition to the above advantages, the silicones of the invention exhibit a greater water repellency than the hydrocarbon silicones such as dimethyl silicone. A noted drawback of dimethyl silicone paints is that thin liquid films of the silicone are not particularly useful in preventing corrosion on metal surfaces since water vapor can pass through the films and attack the metal. The marked increase in water repellency of silicones of the invention, however, makes them much more useful as in anti-corrosive protection coatings. This same property can be advantageously utilized in the application of the silicones of the invention to the treatment of masonry, synthetic fabrics, glassware etc.

The silicone oils and silcone rubbers provided by the invention have in general a wider field of application than their non-fluorinated counterparts by virtue of their increased thermal and chemical stability and other improved properties. Specific uses to which the fluorinated oils and solid polymers may be put are in the production of protective coatings, particularly where water repellency is desired, as lubricants, mold release agents and in the fabrication of electrical insulating materials, gaskets, seals, diaphragms, particularly in applications where exposure to relatively high temperatures and corrosive chemical conditions is involved.

I claim:

A compound of the formula $[(CF_3)_2CHCH_2]_2SiCl_2$ (References on following page)

References Cited by the Examiner

UNITED STATES PATENTS

| | | | |
|---|---|---|---|
| 2,439,689 | 4/48 | Hyde | 260—46.5 |
| 2,460,795 | 2/49 | Warrick | 260—46.5 |
| 2,481,052 | 9/49 | Warrick | 260—46.5 |
| 2,532,583 | 12/50 | Tyran | 260—448.2 |
| 2,721,873 | 10/55 | MacKenzie | 260—448.2 |
| 2,838,423 | 6/58 | Gilkey | 260—448.2 |
| 2,894,969 | 7/59 | Pierce | 260—46.5 |
| 2,934,549 | 4/60 | Tarrant et al. | 260—448.2 |
| 3,070,617 | 12/62 | Holbrook | 260—448.2 |

OTHER REFERENCES

Pierce et al.: III, "Jour. Am. Chem. Soc.," vol. 75, Nov. 1953, pp. 5618–20.

McBee et al.: I, ibid., vol. 77, March 1955, pp. 1292–3.

McBee et al.: II, ibid., vol. 79, May 1957, pp. 2329–32.

Geyer et al.: "Jour. Chem. Soc."(London), Nov. 1957, pp. 4472–9.

Rochow: "An Introduction to the Chemistry of the Silicones," 2nd ed., 1951, John Wiley and Sons, Inc., N.Y., publ. pp. 41–3.

Pierce et al.: II, WADC Technical Report 52–191, part 2, Obtainable as AD No. 23169, from ASTIA, Document Service Center, Knott Bldg., Dayton 2, Ohio.

Clark, WADC Tech. Report 54–213, July 1954, Obtainable as AD No. 47085, from ASTIA, Document Service Center, Knott Bldg., Dayton 2, Ohio.

Tarrant: WADC Tech. Report 55–220, Aug. 1955, Obtainable as AD No. 93332, from ASTIA, Document Service Center, Knott Bldg., Dayton 2, Ohio.

Rochow: Chem. of the Silicones, 2nd ed., 1951, pp. 80 and 81, publ. by J. Wiley & Sons, N.Y.

Pierce et al.: I, WADC Tech. Report 52–191, Part 1, Oct. 1952, Obtainable as AD No. 1121, from ASTIA, Document Service Center, Knott Bldg., Dayton 2, Ohio.

TOBIAS E. LEVOW, *Primary Examiner.*

MILTON STERMAN, ALPHONSO D. SULLIVAN,
*Examiners.*